US008963996B2

(12) United States Patent  
Ngo et al.

(10) Patent No.: US 8,963,996 B2  
(45) Date of Patent: Feb. 24, 2015

(54) COMMUNICATION OF STEREOSCOPIC THREE-DIMENSIONAL (3D) VIDEO INFORMATION INCLUDING AN UNCOMPRESSED EYE VIEW VIDEO FRAMES

(75) Inventors: Chiu Ngo, San Francisco, CA (US); Ju-Lan Hsu, San Jose, CA (US); Huai-Rong Shao, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 160 days.

(21) Appl. No.: 13/095,775

(22) Filed: Apr. 27, 2011

(65) Prior Publication Data

US 2011/0273533 A1 Nov. 10, 2011

Related U.S. Application Data

(60) Provisional application No. 61/331,674, filed on May 5, 2010.

(51) Int. Cl.  
*H04N 13/00* (2006.01)

(52) U.S. Cl.  
CPC ....... *H04N 13/0029* (2013.01); *H04N 13/0048* (2013.01); *H04N 13/0059* (2013.01)  
USPC .......................................................... 348/43

(58) Field of Classification Search  
USPC ........................... 348/43; 375/240.01–240.29  
See application file for complete search history.

(56) References Cited

U.S. PATENT DOCUMENTS 5,384,861 A * 1/1995 Mattson et al. ............... 382/131  
6,215,516 B1 * 4/2001 Ma et al. ......................... 348/43

(Continued)

FOREIGN PATENT DOCUMENTS

CN 101536329 A 9/2009  
JP 08205198 A 8/1996

(Continued)

OTHER PUBLICATIONS

Triantafyllidis, G. et al., "Coding of Stereoscopic and Three Dimensional Images and Video—Introduction, Disparity estimation, Stereo video coding, Standardization Efforts, Conclusions", Encyclopedia of Multimedia, Part 3, Springer US, 2008, pp. 63-67, United States, downloaded from http://encyclopedia.jrank.org/articles/pages/6686/Coding-of-Stereoscopic-and-3D-Images-and-Video.html.

(Continued)

*Primary Examiner* — Dave Czekaj  
*Assistant Examiner* — Leron Beck  
(74) *Attorney, Agent, or Firm* — Sherman IP LLP; Kenneth L. Sherman; Steven Laut

(57) ABSTRACT

Communication of stereoscopic three dimensional (3D) video information. One embodiment comprises wireless communication of stereoscopic 3D video information including an uncompressed first eye view video frame and a corresponding stereoscopic uncompressed second eye view video frame, from a transmitting wireless station to a receiving wireless station. In one embodiment, a set of pixels in an uncompressed first eye view video frame is transmitted over a wireless communication medium. Pixel information in a set of pixels in an uncompressed second eye view video frame corresponding to the first eye view set of pixels is reduced to generate a reduced set of pixels. The reduced set of pixels is transmitted over the wireless communication medium. At the receiving wireless station, an uncompressed second eye view video set of pixels is reconstructed based on said first eye view set of pixels and said reduced set of pixels.

36 Claims, 6 Drawing Sheets

(56) References Cited

U.S. PATENT DOCUMENTS

| | | | |
|---|---|---|---|
| 6,888,563 B2 | | 5/2005 | Suzuki et al. |
| 7,181,050 B1* | | 2/2007 | Daly et al. .................... 382/118 |
| 8,411,134 B2* | | 4/2013 | Tomita ............................ 348/43 |
| 2003/0112864 A1* | | 6/2003 | Karczewicz et al. .... 375/240.01 |
| 2005/0254113 A1* | | 11/2005 | Cirkel et al. .................. 359/259 |
| 2007/0098063 A1* | | 5/2007 | Reznic et al. .............. 375/240.2 |
| 2007/0263937 A1* | | 11/2007 | Rizko ........................... 382/232 |
| 2007/0297502 A1* | | 12/2007 | Reznik .......................... 375/240 |

FOREIGN PATENT DOCUMENTS

| | | |
|---|---|---|
| JP | 08214336 A | 8/1996 |
| JP | 2001285895 A | 10/2001 |
| JP | 200277945 | 3/2002 |

OTHER PUBLICATIONS

Broadcom Corporation et al., "WirelessHD Specification Version 1.1 Overview," WirelessHD, May 2010, pp. 1-95, United States, downloaded from http://www.wirelesshd.org/pdfs/WirelessHD-Specification-Overview-v1.1May2010.pdf.

Wireless Gigabit (WiGig) Alliance, "WiGig White Paper, Defining the Future of Multi-Gigabit Wireless Communications", WiGig Alliance, Jul. 2010, pp. 1-5, United States.

Cordeiro, C. et al., "IEEE P802.11 Wireless LANs, PHY/MAC Complete Proposal Specification (IEEE 802.11-10/0433r2)", IEEE, May 18, 2010, pp. 1-335, United States.

Hitachi, Ltd. et al., "High-Definition Multimedia Interface Specification Version 1.4", HDMI Licensing, LLC, Jun. 5, 2009, pp. i-ii, 137, 143-145, and 184-197, United States.

International Search Report and Written Opinion dated Jan. 2, 2012 for International Application No. PCT/KR2011/003262 from Korean Intellectual Property Office, pp. 1-10, Seo-gu, Daejeon, Republic of Korea.

Chinese Office Action dated Sep. 3, 2014 for Chinese Application No. 201180033399.8 from The State Intellectual Property Office of P.R. China, pp. 1-24, Beijing, China (English-language translation attached, pp. 13-24).

* cited by examiner

100

COMMUNICATION OF STEREOSCOPIC THREE-DIMENSIONAL (3D) VIDEO INFORMATION INCLUDING AN UNCOMPRESSED EYE VIEW VIDEO FRAMES

RELATED APPLICATION

This application claims priority from U.S. Provisional Patent Application Ser. No. 61/331,674, filed on May 5, 2010, incorporated herein by reference.

FIELD OF THE INVENTION

The present invention relates to networks, and in particular, to communication of video information in communication networks.

BACKGROUND OF THE INVENTION

The emergence of technologies for processing of video information representing three dimensional (3D) video content (3D video) such as 3D television (TV) technologies has enhanced user viewing experience. However, meeting transmission bandwidth requirements for 3D video is challenging especially over a wireless medium.

BRIEF SUMMARY OF THE INVENTION

Embodiments of the present invention provide a method and system for communication of stereoscopic 3D video. One embodiment comprises wireless communication of 3D stereoscopic video information including an uncompressed first eye view video frame and a corresponding stereoscopic uncompressed second eye view video frame, from a transmitting wireless station to a receiving wireless station. In one embodiment, a set of pixels in an uncompressed first eye view video frame is transmitted over a wireless communication medium. Pixel information in a set of pixels in an uncompressed second eye view video frame corresponding to the first eye view set of pixels is reduced to generate a reduced pixel set of pixels. The reduced set of pixels is transmitted over the wireless communication medium. At the receiving wireless station, an uncompressed second eye view video set of pixels is reconstructed based on said first eye view pixel set of pixels and said reduced set of pixels.

These and other features, aspects and advantages of the present invention will become understood with reference to the following description, appended claims and accompanying figures.

DESCRIPTION OF THE INVENTION

Embodiments of the present invention provide a method and system for wireless communication of stereoscopic 3D video information in wireless communication networks. One embodiment comprises a system implementing a method of wireless communication of 3D stereoscopic video information by deconstructing a first eye view video frame and a corresponding second eye view video frame. A set of pixels in the uncompressed first eye view video frame is transmitted from a transmitting wireless station over a wireless communication medium. Pixel information in the second eye view set of pixels is reduced, and the reduced set of pixels is transmitted from the transmitting wireless station over the wireless communication medium. At a receiving wireless station, an uncompressed second eye view video set of pixels is reconstructed based on a received uncompressed first eye view set of pixels and a received reduced corresponding second eye view set of pixels.

In an alternative embodiment of the present invention, the video information is transmitted via a communication medium. The communication medium may be wireless, wired, or some other medium in which information is moved from an information transmitter to an information receiver.

Figure 1A:
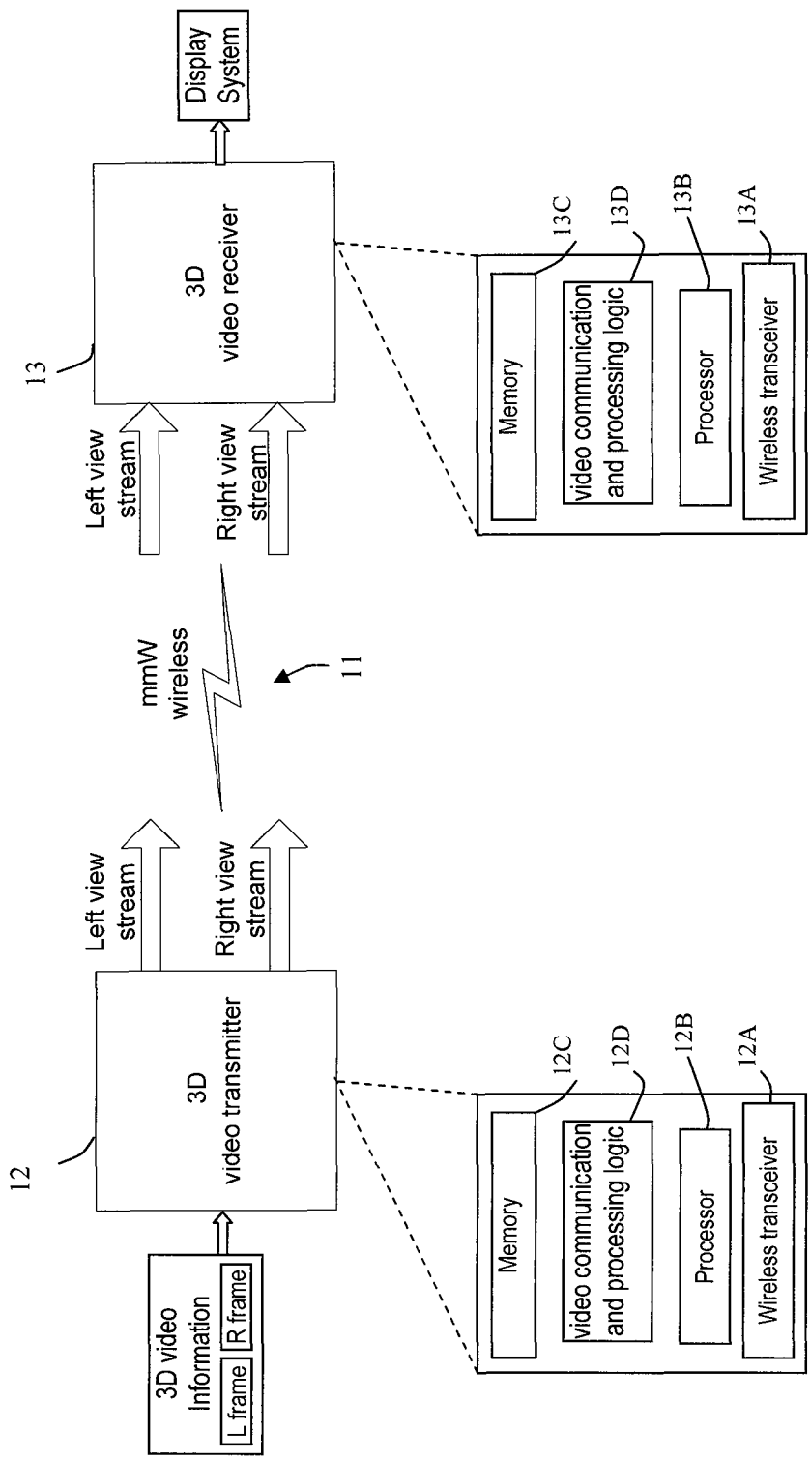
FIG. 1A shows a block diagram of a wireless communication system for wireless communication of stereoscopic 3D video information, according to an embodiment of the invention.

Referring to the drawings, one implementation of the invention comprises a wireless communication system configured by a process that reduces the transmission burden for uncompressed stereoscopic 3D video streams. FIG. 1A shows a video streaming wireless communication system 10 comprising a wireless station comprising a transceiver functioning as a transmitting station (transmitter) 12, and a wireless station comprising a transceiver functioning as a receiving station (receiver) 13. In one example, the wireless communication system 10 comprises a wireless network such as a millimeter-wave (mmW) wireless local/personal area network, according to an embodiment of the invention.

The wireless system 10 is configured for wireless communication of 3D video over a wireless communication medium 11 (e.g., radio frequency (RF)), such as 60 GHz wireless medium, from the transmitting wireless station 12 to the receiving wireless station 13, according to an embodiment of the invention. In this example, the 3D video comprises uncompressed digital 3D video information. In one embodiment, the transmitting wireless station 12 comprises a wireless transceiver 12A, a processor 12B, memory 12C, and video communication and processing logic 12D, according to an embodiment of the invention. The processing logic 12D for deconstructing video frames at the transmitting station 12, according to embodiments of the invention, is described further below. The receiving wireless station 13 comprises a wireless transceiver 13A, a processor 13B, memory 13C, and video communication and processing logic 13D, according to an embodiment of the invention. The processing logic 13D for reconstructing video frames at the receiving station 13 according to embodiments of the invention is described further below.

Figure 1B:
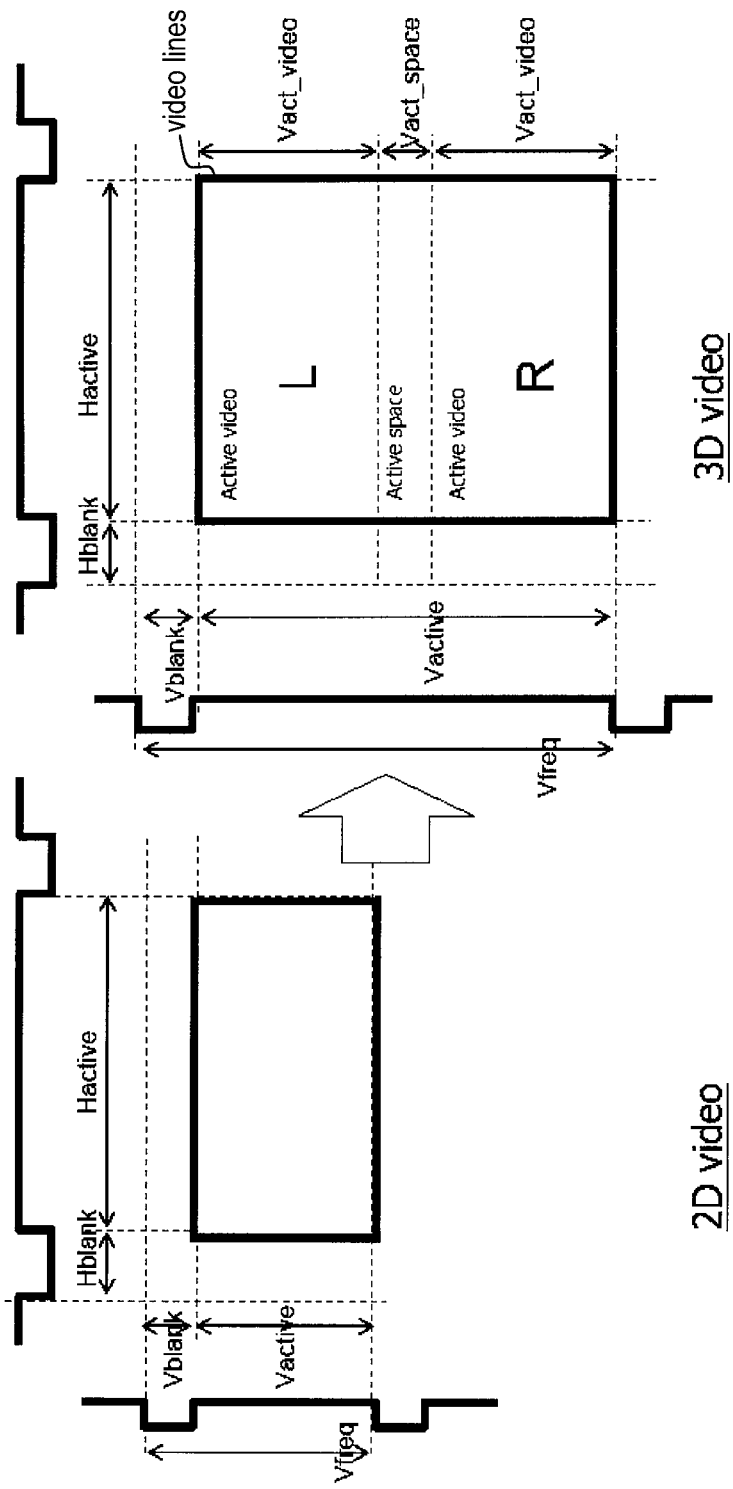
FIG. 1B illustrates two dimensional (2D) and 3D video frames.

FIG. 1B shows a comparison of 2D video and 3D stereoscopic video (3D video). In one example, the 3D video information includes at least two video streams: a first eye view stream, and a corresponding second eye view stream. In the embodiments described herein, the first eye view stream comprises a left-eye view stream (L), and the second eye view stream comprises a right-eye view stream (R). Those skilled in the art will recognize that the invention is equally applicable where the first eye view stream comprises as a right-eye view stream, and the second eye view stream comprises a left-eye view stream. Such 3D video provides illusion of depth in an image by presenting two offset 2D images separately to the left and right eye of the viewer (i.e., L video frame and R video frame). The offset 2D images (i.e., L video frame and R video frame) are combined and provide perception of 3D depth in an image. In one example, a light source splits the images directionally into the eyes of the viewer.

Embodiments of the invention provide reduction in the wireless communication rate requirements by taking advantage of the redundant information residing in the L and R frames of the stereoscope 3D video format in deconstructing the video frames. For example redundant information may include information in an R frame that also resides in same/similar spatial locations in a corresponding L frame. Such redundant information in an R frame need not be transmitted, or a subset of such redundant information may be transmitted.

One embodiment of the invention provides a process for wireless communication of 3D fully uncompressed L frame video and a reduced R frame with differential values. Another embodiment of the invention provides a process for wireless communication of 3D fully uncompressed L frame and a reduced R frame with estimated differential values. Another embodiment of the invention provides a process for wireless communication of 3D fully uncompressed L frame and a compressed R frame. Another embodiment of the invention provides alternate communication of a fully uncompressed L frame and a reduced or compressed R frame for even video frames, and a reduced or compressed L frame and a fully uncompressed R frame for odd video frames, or vice versa. This helps average the visual effect for both 3D video frames at a receiving wireless station.

Wireless Communication Process for a 3D Fully Uncompressed L Frame and a Reduced R Frame with Differential Values For uncompressed video streams, the wireless communication overhead may be reduced depending on the available transmitter and/or receiver buffer size and the expected video quality of service (QoS). According to an embodiment of the invention, it is assumed that the receiver memory buffer size is of at least one uncompressed video frame, and there are different transmitter memory buffer sizes. A communication process according to an embodiment of the invention utilizes the spatial correlation between corresponding sets of pixels (e.g., one or more video pixel lines) in the L and R frames for deconstructing video frames.

According to an embodiment of the invention, given a receiver memory buffer size of at least one uncompressed frame and a transmitter buffer size of at least one uncompressed frame plus one additional line, the transmission of the R frame may be reduced by taking into account (or exploiting the property) of the correlation between corresponding lines in the L and the R frames (which are generated by two slightly displaced cameras originally).

Figure 2:
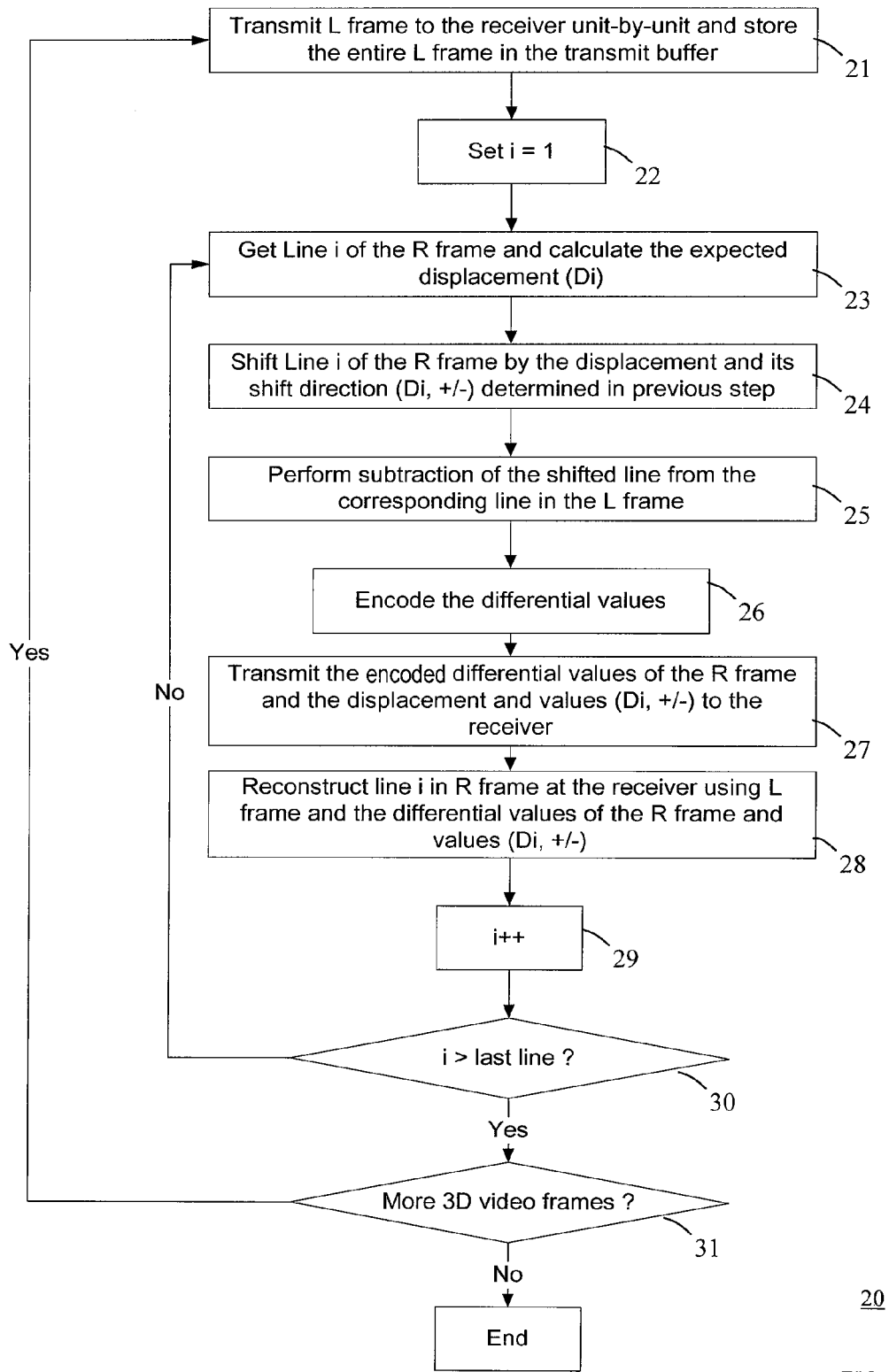
FIG. 2 shows a flowchart of a process for communication of stereoscopic 3D video information, according to an embodiment of the invention.

FIG. 2 shows a flowchart of a communication process 20 for transmitting a fully uncompressed L frame and a corresponding reduced R frame with differential values, and reconstructing the R video frame at a receiving station, according to an embodiment of the invention. The reduction of the R frame is based on spatial correlation between the corresponding video pixel units (e.g., lines of digital pixels) in the L and R frames. FIG. 2 illustrates an example process comprising transmitting a fully uncompressed L frame to a receiver station unit-by-unit (e.g., line-by-line, macroblock, pixel, sets of pixels, or other video information unit), storing the entire L frame in the transmit buffer memory, transmitting a reduced corresponding R frame, and reconstructing the R frame at a the receiver. The process 20 includes the following process blocks:

Block 21: Transmit the fully uncompressed L frame to the receiver unit-by-unit and store the entire L frame in the transmit buffer.

Block 22: Set an index i=1.

Block 23: Obtain Line i of the uncompressed R frame and conduct signal processing with at least Line i of the stored L frame to determine the expected displacement Di (in terms of number of pixels) to the right or to the left between the stereoscopic L and R frames.

Block 24: Shift Line i of the R frame by the determined displacement and its shift direction (Di, +/−), wherein "+" indicates right shift, and "−" indicates left shift.

Block 25: Subtract the shifted line from the corresponding line in the L frame.

Block 26: Encode the differential values (e.g., using Entropy coding, Run Length Coding (RLC), or Huffman coding, etc).

Block 27: Transmit the encoded differential values of the R frame and the displacement and its shift direction values (Di, +/−) to the receiver.

Block 28: At the receiver, decode the differential values and reconstruct the line in the R frame using the L frame and the differential values of that line of the R frame and values (Di, +/−). The receiver has a buffer memory of at least one uncompressed frame plus Active-Space lines plus one additional line. During Active-Space lines, a source transmits a constant pixel value, and a sink ignores all data received during the active space lines regardless of the value.

Block 29: Increment index i by 1.

Block 30: If the last line of R frame, proceed to block 31, else proceed to block 23 to repeat blocks 23-29 for the other lines in the R frame.

Block 31: Repeat blocks 21-29 for subsequent 3D L and R video frame in the video stream.

Process blocks 23-26 provide an example of a process to reduce the size of an R frame. Since the images captured by the left and right eyes of a user may have a slight shift in position, process blocks estimate a value for such shift. The shifting in adjusted R frames are to calculate the difference values of pixels between the R and L frames. The difference values are encoded to reduce the size of the R frame. The process 20 is applicable to transmit a reduced L frame with differential values and a fully uncompressed R frame.

In one embodiment, instead of determining the expected displacement Di for each Line i, the expected displacement Di of each pixel of Line i may be determined. Further, instead of determining the expected displacement Di of each Line i, the frames may be divided into macroblocks and the expected displacement of each macroblock may be determined.

In one embodiment, the expected displacement Di may have a resolution of one pixel. The expected displacement Di may have sub-pixel resolution. The resolution of the expected displacement Di may have be greater than one pixel.

The expected displacement Di may be along a single dimension. The single dimension may be along the horizontal axis. The single dimension may be along a single axis that is skewed from the horizontal.

According to embodiments of the invention, instead of a single line, a 2-dimensional set of pixels (that needs 2 lines or more) may be used to estimate the displacement.

Embodiments of the invention further provide alternate transmission of a fully L uncompressed frame and reduced R frame with differential values for even video frames, and a reduced L frame with differential values and a fully uncompressed R frame for odd video frames, or vice versa. In addition, if it is learned that a user's left eye is more sensitive to video/image than the right eye, the transmission can be adapted with a pattern of more fully uncompressed L frames and reduced R frames with differential values, than a reduced L frame with differential values and a fully uncompressed R frame, or vice versa.

Figure 3:
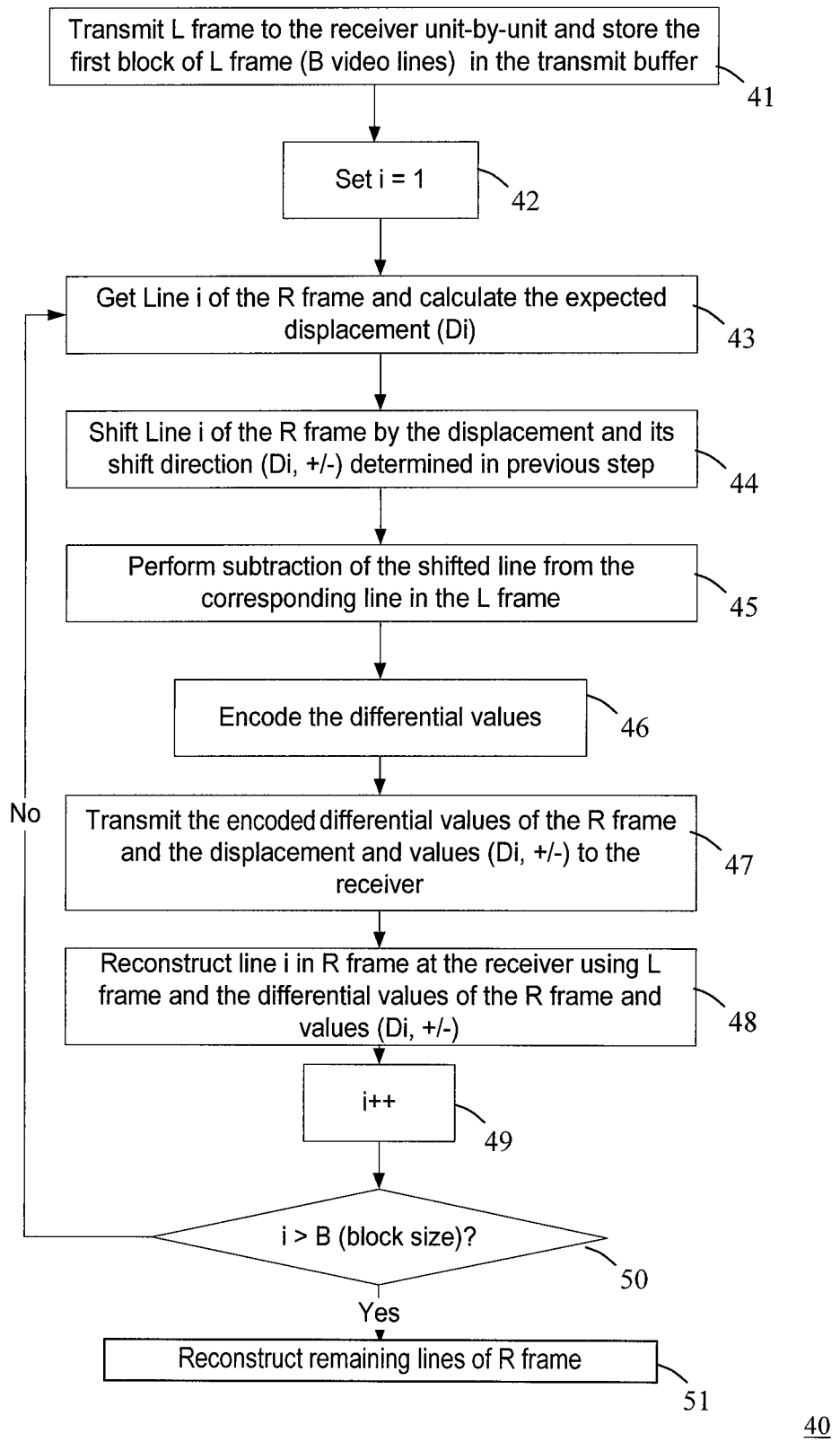
FIG. 3 shows a flowchart of a process for communication of stereoscopic 3D video information, according to another embodiment of the invention.

Wireless Communication Process for a 3D Fully Uncompressed L Frame and a Reduced R Frame with Estimated Differential Values According to an embodiment of the invention, where receiver buffer size is of at least one uncompressed frame and a transmitter buffer size is of a few uncompressed video lines (e.g., a set of B video lines), and transmission bandwidth is suitable for a fully uncompressed L frame and a partial uncompressed R frame, the transmission of information for the R frame may be reduced by estimating the displacement of the R frame with respect to the corresponding L frame. FIG. 3 shows an example communication process 40 wherein the transmitter buffer is of the size for B video lines, wherein the process 40 comprises the following process blocks:

Block 41: Transmit fully uncompressed L frame to the receiver unit-by-unit (e.g., line-by-line) and store the first set of pixels (B video lines) of the L frame in the transmitter buffer.

Block 42: Set index i=1.

Block 43: Obtain Line i of the corresponding uncompressed R frame and conduct some signal processing with at least Line i of the stored lines of the L frame to determine the expected displacement Di (in terms of number of pixels) to the right or to the left between the stereoscopic L and R frames.

Block 44: Shift Line i of the R frame by the determined displacement and its shift direction (Di, +/−).

Block 45: Subtract the shifted line of the R frame from the corresponding line in the L frame.

Block 46: Encode the differential values (e.g., Entropy coding, Run Length Coding (RLC) or Huffman coding, etc).

Block 47: Transmit the encoded differential values of the first line of R frame and the displacement and its shift direction values (Di, +/−) from the transmitter to the receiver.

Block 48: At the receiver, decode the differential values and re-construct Line i in the R frame based on the L frame, the displacement and shift direction (Di, +/−), and the differential values of that line in the R frame.

Block 49: Increment index i by 1.

Block 50: If i is greater than the set size B, proceed to block 51, else proceed to block 43 to repeat blocks 43-49 for remaining lines in said set of B video lines.

Block 51: Reconstruct the remaining lines in the R frame. Examples of such reconstruction include: (a) shift the line of the L frame by using the determined estimated displacement (Di, +/−) and add the same differential line values from the corresponding Line of the L frame to the resulting line values, or (b) shift the line of the L frame by using the determined estimated displacement (with corrections as needed). As the left and right eyes do not capture two images at the exact same position in space, the right edge of R frame may not always be directly reconstructed from the L frame and some correction may be needed at edges of both the L and R frames.

The above example shows the case wherein a transmit buffer size is of B video lines and only B signal-processed lines of the R frame, according to process blocks 43-48, are transmitted to the receiver (while remaining lines of the R frame are not transmitted to the receiver). Reconstruction of the R frame at the receiver is performed by first reconstructing a set of B lines of R frames using said estimated displacement values and the differential values. At the receiver, the displacement values and the differential values can be used with the remaining lines of the L frame (beyond said set of B video lines) to reconstruct the remaining videl lines of the R frame at the receiver.

According to embodiments of the invention, instead of a single line, a 2-dimensional set of pixels (that needs 2 lines or more) may be used to estimate the displacement.

The process 40 is scalable to the number of lines (e.g., set of pixels) of the L frame that can be stored in the transmit buffer. If the set size equals the number of lines in the L frame, then the process 40 is similar to process 20 further above.

The process 40 may be easily modified to transmit a reduced L frame with estimated differential values and a fully uncompressed R frame. An alternate transmission of 3D video information may include a fully uncompressed L frame and a reduced R frame with estimated differential values for even video frames. In one embodiment, reducing a frame is accomplished according to process blocks 43-49. The alternate transmission of 3D video information may also include a reduced L frame with estimated differential values and a fully uncompressed R frame for odd video frames. The alternate transmission of 3D video information may help smooth out the average user's visual perception of both frames. In addition, if it is learned that a user's left eye is more sensitive to video/image than the right eye, the transmission can be adapted with a pattern of more fully uncompressed L frame and reduced R frame with estimated differential values, than reduced L frame with estimated differential values and a fully R frame, or vice versa.

Wireless Communication Process for a 3D Fully Uncompressed L Frame and a Compressed R Frame In another embodiment of the invention, it is assumed that that transmitter and receiver each have a video buffer size of at least one set of pixels in an uncompressed frame of video pixels (e.g., B video lines). A codec (compression/decompression) operation is applied to one of the L or R frames. In cases where the receiver buffer size is less than one set of pixels, only fully uncompressed L and fully uncompressed R frames are transmitted.

In another embodiment, when the receiver and transmitter buffer sizes are the size of one set of pixels in an uncompressed frame (e.g., B video lines), and the transmission bandwidth is suitable for a fully uncompressed L frame and a coded (i.e., compressed) R frame only, the R frame is reduced by compression with intra-frame codec technique such as in MPEG or H.264. As such, an uncompressed L frame and a compressed R frame are transmitted. At the receiver, the R frame is reconstructed using the video decoder at the receiver. This assumes that a codec is implemented in the wireless system. Video compression for an uncompressed video frame can use intra-frame video compression modes specified in various standards such as H.264, MPEG2, JPEG2000, etc.

In one example, the transmitter and receiver wireless stations form a wireless local area network that implements a frame structure for wireless communication of data. The frame structure, utilizes packet communication in a Media Access Control (MAC) layer and a physical (PHY) layer.

Each wireless station includes a MAC layer and a PHY layer. The MAC layer receives a data packet including payload data, and attaches a MAC header thereto, in order to construct a MAC Protocol Data Unit (MPDU). The MAC header includes information such as a source address (SA) and a destination address (DA). The MPDU is a part of a PHY Service Data Unit (PSDU) and is transferred to a PHY layer in the AP to attach a PHY header (i.e., a PHY preamble) thereto to construct a PHY Protocol Data Unit (PPDU). The PHY header includes parameters for determining a communication scheme including a coding/modulation scheme.

The MAC layer of the transmitter wireless station includes a transmit video logic module (e.g., logic 12D in FIG. 1A) which implements a 3D video processing and communication module according to embodiments of the invention as described herein. Similarly, the MAC layer of the receiver includes a receive video logic module (e.g., logic 13D in FIG. 1A) which implements a 3D video processing and communication module according to embodiments of the invention as described herein. The example transmitter and receiver wireless stations are capable of performing directional communication such as by antenna training and beamforming, according to embodiments of the invention.

Figure 4:
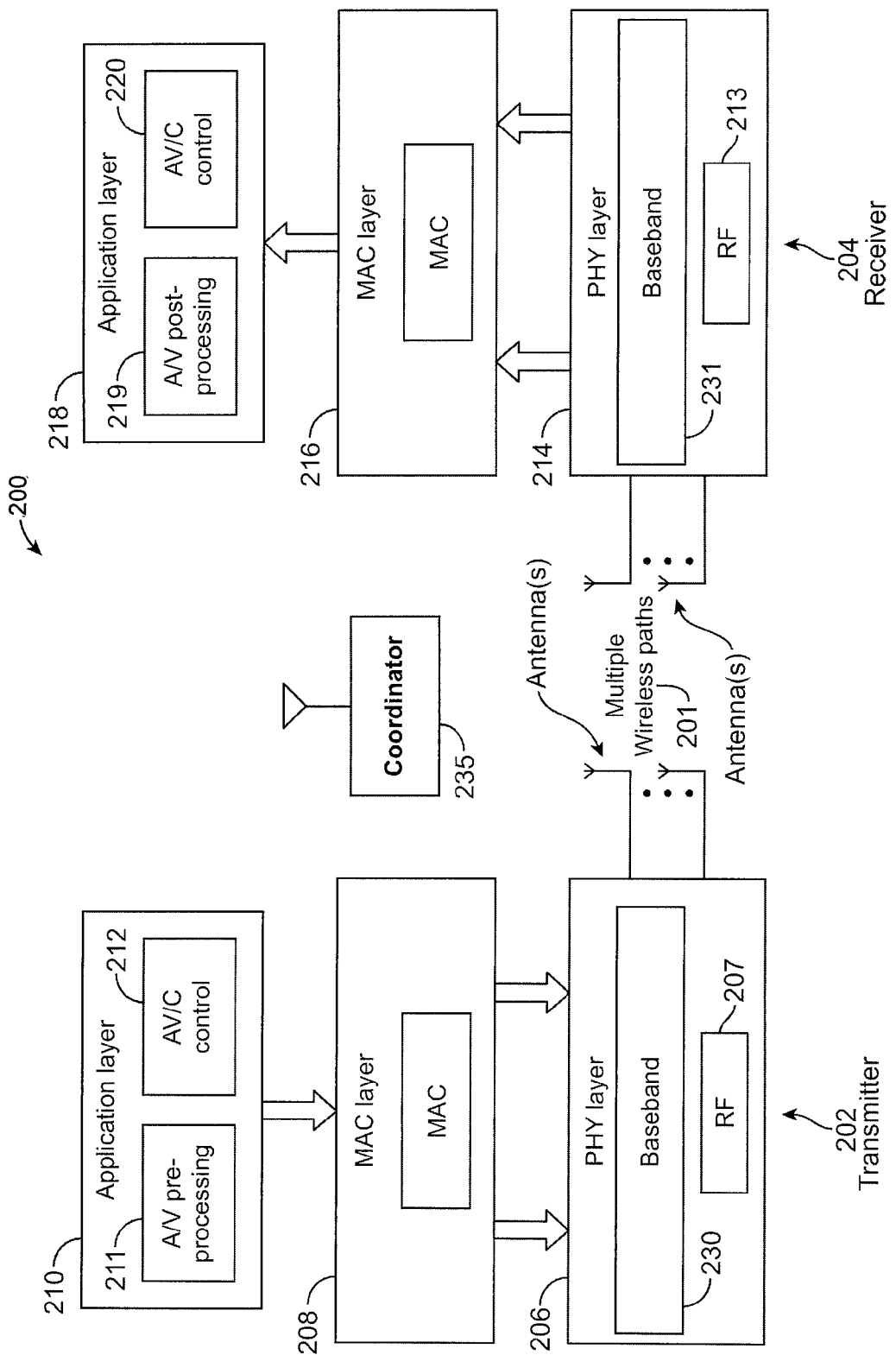
FIG. 4 shows a block diagram of a wireless local area network for wireless communication of stereoscopic 3D video information, according to an embodiment of the invention.

FIG. 4 shows a block diagram of an example wireless communication system 200, implementing 3D video communication, according to an embodiment of the present invention. The system 200 includes a wireless station 202 functioning as a transmitter and a wireless station 204 functioning as a receiver, for 3D video communication according to embodiments of the invention. The transmitter 202 comprises an example implementation of the transmitter 12 in FIG. 1A, and the receiver 204 comprises an example implementation of the receiver 13 in FIG. 1A. The system 200 may further include a coordinator module 235 that facilitates video transmissions, such as in infrastructure mode. The coordinator 235 may comprise a logical module that can be implemented as a stand-alone device or as part of the transmitter 202 or the receiver 204.

The transmitter 202 includes a PHY layer 206, a MAC layer 208 and an application layer 210. The PHY layer 206 includes an RF communication module 207 which transmits/receives signals under control of a baseband process module 230, via multiple wireless paths 201 over RF channels. The baseband module 230 allows wireless communication of control information and video information.

The application layer 210 includes an audio/visual (A/V) pre-processing module 211 for providing 3D video frame streams. The 3D video frames are then converted to MAC packets by the MAC layer 208.

In one embodiment, the pre-processing module 211 performs transmitter side 3D video communication including video deconstruction by dismantling incoming video frames and selective reduction of the frames for transmission, according to embodiments of the invention (such as described above in relation to FIGS. 2-3). In another embodiment, the MAC layer 208 performs transmitter side 3D video communication according to embodiments of the invention. In another embodiment, the pre-processing module 211 and the MAC layer 208 collaboratively perform transmitter side video communication according to embodiments of the invention.

The application layer 210 further includes an AV/C control module 212 which sends stream transmission requests and control commands to reserve channel time blocks for transmission of packets over wireless channels.

The receiver 204 includes a PHY layer 214, a MAC layer 216, and an application layer 218. The PHY layer 214 includes a RF communication module 213 which transmits/receives signals under control of a baseband process module 231.

The MAC layer 216 provides received video information in MAC packets, to the application layer 218. The application layer 218 includes an A/V post-processing module 219 for processing received video frames into video streams for consumption (e.g., display on a display screen for user viewing).

In one embodiment, the MAC layer 216 further implements receiver-side 3D video communication including 3D video reconstruction according to embodiments of the invention (such as described above in relation to FIGS. 2-3). In another embodiment, A/V post-processing module 219 further implements receiver-side 3D video communication including 3D video reconstruction according to embodiments of the invention. In another embodiment, the MAC layer 216 and the A/V post-processing module 219 collaboratively implement receiver-side 3D video communication including 3D video reconstruction according to embodiments of the invention.

The application layer 218 further includes an AV/C control module 220 which handles stream control and channel access. Beamforming communications between the transmitter 202 and the receiver 204 may be performed over multiple RF channels. The MAC/PHY layers may perform antenna training and beaming switching control as needed according to known techniques.

Embodiments of the invention are applicable to wireless devices and systems, such as wireless systems implementing millimeter-wave communications for communication of audio/video (A/V) information over radio frequency channels. For example, embodiments of the invention are applicable for WiGig and WirelessHD (WiHD) wireless networks, such as WiGig 3D A/V support. WiGig is a standard promoted by Wireless Gigabit Alliance for multi-gigabit-speed wireless communications technology operating over the 60 GHz spectrum. WiHD is an industry-led effort to define a specification for the next generation wireless digital network interface for wireless high-definition signal communication for consumer electronics products.

In one implementation of the invention, a vendor specific codec ID may be assigned, wherein the transmitter (sender) informs the receiver of its vendor specific codec support, as well as its video buffer size in an A/V Capability Request frame. The transmitter similarly determines which vendor specific codecs the receiver (sink) supports as well as the receiver video buffer size via an A/V Capability Response frame from the receiver. If the receiver supports the codec processes of the transmitter, the transmitter and receiver may utilize Vendor Specific Codec Select Request and Response frames to select the proper configuration of the communication process based on their capabilities, perform A/V connection setup over a wireless channel, and implement A/V communication according to embodiments of the invention. In one example, the payload of the vendor specific A/V content may include: the uncompressed L frame, the displacement (Di, +/−), and the encoded differential pixel values for the R frame, which may be placed sequentially in the payload (e.g., packets).

As those skilled in the art recognize, embodiments of the invention can be modified to transmit a compressed L frame and a fully uncompressed R frame. Alternate transmission of a fully uncompressed L frame and a compressed R frame, for even video frames, and a compressed L frame and a fully uncompressed R frame, for odd video frames, or vice versa, can help average out a user's visual perception of both frames.

In addition, if a user's left eye is more sensitive to video/image than the right eye, the transmission can be adapted with a pattern of a fully uncompressed L frame and a more fully compressed R frame than the compressed L frame and a fully uncompressed R frame, or vice versa.

As is known to those skilled in the art, the aforementioned example architectures described above, according to the present invention, can be implemented in many ways, such as program instructions for execution by a processor, as software modules, microcode, as computer program product on computer readable media, as logic circuits, as application specific integrated circuits, as firmware, as consumer electronic devices, etc., in wireless devices, in wireless transmitters/receivers, in wireless networks, etc. Further, embodiments of the invention can take the form of an entirely hardware embodiment, an entirely software embodiment or an embodiment containing both hardware and software elements.

Figure 5:
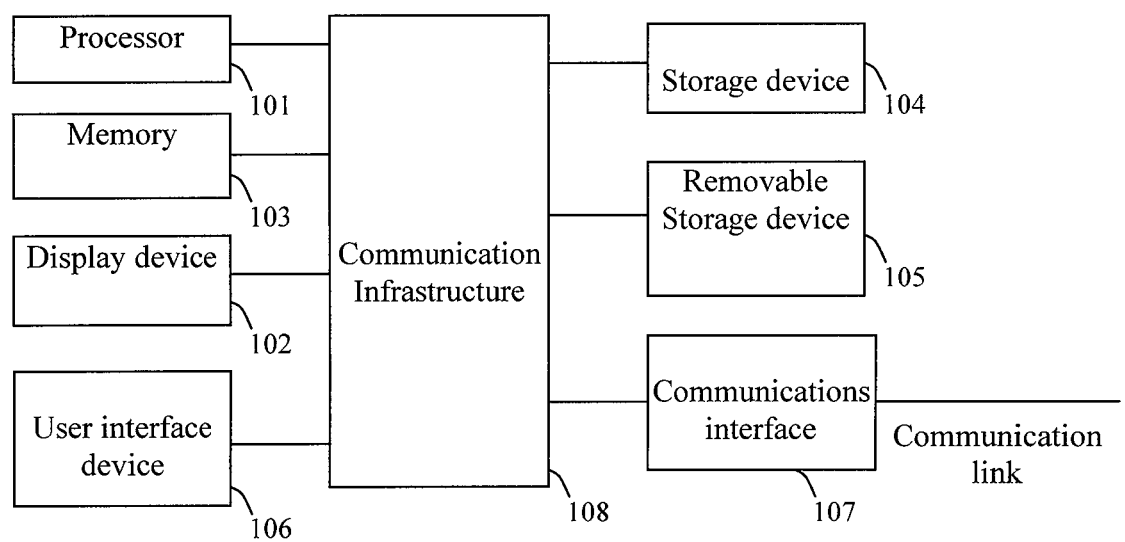
FIG. 5 shows a high level block diagram showing an information processing system comprising a computer system useful for implementing an embodiment of the present invention.

FIG. 5 shows a high level block diagram showing an information processing system comprising a computer system 100 useful for implementing an embodiment of the present invention. The computer system 100 includes one or more processors 101, and can further include an electronic display device 102 (for displaying graphics, text, and other data), a main memory 103 (e.g., random access memory (RAM)), storage device 104 (e.g., hard disk drive), removable storage device 105 (e.g., removable storage drive, removable memory module, a magnetic tape drive, optical disk drive, computer readable medium having stored therein computer software and/or data), user interface device 106 (e.g., keyboard, touch screen, keypad, pointing device), and a communication interface 107 (e.g., modem, a network interface (such as an Ethernet card), a communications port, or a PCMCIA slot and card). The communication interface 107 allows software and data to be transferred between the computer system and external devices. The system 100 further includes a communications infrastructure 108 (e.g., a communications bus, cross-over bar, or network) to which the aforementioned devices/modules 101 through 107 are connected.

Information transferred via communications interface 107 may be in the form of signals such as electronic, electromagnetic, optical, or other signals capable of being received by communications interface 107, via a communication link that carries signals and may be implemented using wire or cable, fiber optics, a phone line, a cellular phone link, a radio frequency (RF) link, and/or other communication channels.

Computer program instructions representing the block diagram and/or flowcharts herein may be loaded onto a computer, programmable data processing apparatus, or processing devices to cause a series of operations performed thereon to produce a computer implemented process.

Embodiments of the present invention have been described with reference to flowchart illustrations and/or block diagrams of methods, apparatus (systems) and computer program products according to embodiments of the invention. Each block of such illustrations/diagrams, or combinations thereof, can be implemented by computer program instructions. The computer program instructions when provided to a processor produce machine instructions, such that the instructions, which execute via the processor create means for implementing the functions/operations specified in the flowchart and/or block diagram. Each block in the flowchart/block diagrams may represent a hardware and/or software module or logic, implementing embodiments of the present invention.

In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, and a hard disk installed in hard disk drive. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Computer programs (i.e., computer control logic) are stored in main memory and/or secondary memory. Computer programs may also be received via a communications interface. Such computer programs, when executed, enable the computer system to perform the features of the present invention as discussed herein. In particular, the computer programs, when executed, enable the processor or multi-core processor to perform the features of the computer system. Such computer programs represent controllers of the computer system.

Though the present invention has been described with reference to certain versions thereof; however, other versions are possible. Therefore, the spirit and scope of the appended claims should not be limited to the description of the preferred versions contained herein.

What is claimed is:

1. A method of communicating stereoscopic three-dimensional (3D) video information comprising:

employing a physical layer of a transmitting device for transmitting 3D video information based on a first eye viewing position and a second eye viewing position of an image;

reducing pixel information in a set of pixels in an uncompressed second eye view video frame for the image by using encoded pixel difference information between an uncompressed first eye view video frame and the uncompressed second eye view video frame in place of the set of pixels in the uncompressed second eye view video frame, wherein pixel difference information is based on a difference between a shifted line of pixels of the uncompressed first eye view video frame from a corresponding line of pixels for the uncompressed second eye view video frame; and transmitting the set of pixels in the uncompressed first eye view video frame and said encoded pixel difference information, wherein the 3D video information is transmitted as a reduced set of pixels for the uncompressed first eye view video frame and the uncompressed second eye view video frame.

2. The method of claim 1, further comprising:
determining an expected displacement of pixels between the uncompressed first eye view video frame and the uncompressed second eye view video frame;
shifting a line of pixels of the uncompressed first eye view video frame based on the expected displacement and shift direction information for the expected displacement; and
determining said encoded pixel difference information based on spatial correlations between pixels in the first eye view set of pixels and corresponding pixels in the second eye view set of pixels by subtracting the shifted line of pixels for the uncompressed first eye view from the corresponding line of pixels of the uncompressed second eye view video frame,
wherein said encoded pixel difference information, the determined expected displacement of pixels between the uncompressed first eye view video frame and the uncompressed second eye view video frame, the shift direction information for the expected displacement of pixels, and the set of pixels in the uncompressed first eye view video frame are transmitted over a communication medium.

3. The method of claim 2, wherein:
said encoded pixel difference information comprises horizontal pixel difference information, such that vertical pixel difference information is not transmitted over the communication medium.

4. The method of claim 2, wherein:
said encoded pixel difference information comprises an estimate of differences between pixels in the set of pixels for the uncompressed first eye view video frame and corresponding pixels in the set of pixels in the uncompressed second eye view video frame.

5. The method of claim 2, wherein:
the transmitting device comprises a transmitting wireless station, and transmitting over the communication medium comprises transmitting from the transmitting wireless station to a receiving wireless station over a millimeter wave radio frequency wireless channel.

6. The method of claim 2, further comprising:
reconstructing the uncompressed second eye view video set of pixels by a receiving wireless station using said uncompressed set of pixels in the first eye view video frame, the expected displacement of pixels and the shift direction information for the expected displacement of pixels, and said encoded pixel difference information; and
providing a 3D view of the image using the uncompressed first eye view video set of pixels and the reconstructed uncompressed second eye view video set of pixels.

7. The method of claim 1, further comprising reconstructing the uncompressed set of pixels in the second eye view video frame at the receiving station based on the received uncompressed set of pixels in the first eye view video frame and said encoded pixel difference information.

8. The method of claim 2, wherein said encoded pixel difference information has sub-pixel resolution.

9. The method of claim 1, wherein:
a first eye view comprises a left-eye view of the image and a second eye view comprises a right-eye view of the image.

10. The method of claim 1, wherein:
reducing pixel information in a set of pixels in an uncompressed second eye view video frame comprises reducing pixel information in said set of pixels based on using redundant information residing in first eye view video frames for second eye view frame information of a stereoscope 3D video format frame.

11. The method of claim 1, further comprising:
alternately transmitting 3D stereoscopic video information including two pairs of video frames, each pair of video frames including an uncompressed first eye view video frame and a corresponding stereoscopic uncompressed second eye view video frame;
wherein alternately transmitting comprises, for a first pair of video frames:
transmitting a set of pixels in an uncompressed first eye view video frame;
reducing pixel information in a set of pixels in an uncompressed second eye view video frame by using the encoded pixel difference information, expected displacement of pixels information and shift information for the expected displacement of pixels information instead of the set of pixels in the uncompressed second eye view video frame to generate a reduced set of pixels; and
transmitting the reduced set of pixels; and
for a subsequent second pair of video frames:
transmitting a set of pixels in an uncompressed second eye view video frame;
reducing pixel information in a set of pixels in an uncompressed first eye view video frame corresponding to the second eye view set of pixels, to generate a reduced set of pixels; and
transmitting the reduced sets of pixels.

12. The method of claim 6, wherein the reconstructing is performed by a receiving wireless station.

13. A communication station for communicating stereoscopic three-dimensional (3D) video information, comprising:
a video processor that reduces pixel information in a set of pixels in an uncompressed second eye view video frame for an image corresponding to a set of pixels in an uncompressed first eye view video frame for the image using pixel difference information between the set of pixels in the uncompressed first eye view video frame and the set of pixels in the uncompressed second eye view video frame as information for the second eye view video frame, wherein the pixel difference information is based on a difference between a shifted line of pixels for the uncompressed first eye view video frame from a corresponding line of pixels for the uncompressed second eye view video frame; and
a communication module that transmits said pixel difference information instead of the set of pixels in the uncompressed second eye view video frame and said set of pixels in said uncompressed first eye view video frame.

14. The communication station of claim 13, wherein:
the video processor determines the pixel difference information based on spatial correlations between pixels in the first eye view set of pixels set and corresponding pixels in the second eye view set of pixels, and generates the information for the second eye view video frame using the pixel difference information, displacement information and shift direction information; and
the communication module transmits the pixel difference information, displacement information and shift direction information for the information for the second eye view video frame over a communication medium.

15. The communication station of claim 14, wherein:
said pixel difference information comprises difference values between pixels in the first eye view set of pixels and corresponding pixels in the second eye view set of pixels.

16. The communication station of claim 14, wherein:
said pixel difference information comprises horizontal difference information, such that vertical difference information is not transmitted over the communication medium.

17. The communication station of claim 14, wherein:
said pixel difference information comprises an estimate of differences between pixels in the first eye view set of pixels and corresponding pixels in the second eye view set of pixels.

18. The communication station of claim 14, wherein the pixel difference information has sub-pixel resolution.

19. The communication station of claim 13, wherein:
the communication station comprises a wireless transmitting station such that the communication module transmits to a wireless receiving station over a wireless communication medium.

20. The communication station of claim 13, wherein:
a first eye view comprises the left-eye view of the image and a second eye view comprises the right-eye view of the image.

21. The communication station of claim 13, wherein:
the video processor reduces pixel information in a set of pixels in an uncompressed second eye view video frame by reducing pixel information in said set of pixels based on using redundant information residing in one of the first eye view and second eye view frames of stereoscope 3D video format.

22. The communication station of claim 13, wherein:
the communication module alternately transmits 3D stereoscopic video information including two pairs of video frames, each pair of video frame including an uncompressed first eye view video frame and a corresponding uncompressed second eye view video frame, such that:
for a first pair of video frames:
 the communication module transmits a set of pixels in an uncompressed first eye view video frame;
 the video processor reduces pixel information in a set of pixels in an uncompressed second eye view video frame using the pixel difference information in place of the set of pixels in the uncompressed second eye view video frame to generate a reduced set of pixels; and
 the communication module transmits the reduced set of pixels; and
for a subsequent second pair of video frames:
 the communication module transmits a set of pixels in an uncompressed second eye view video frame;
 the video processor reduces pixel information in a set of pixels in an uncompressed first eye view video frame corresponding to the second eye view set of pixels, to generate a reduced set of pixels; and
 the communication module transmits the reduced set of pixels.

23. A receiving communication station for communicating stereoscopic three-dimensional (3D) video information, comprising:
a communication module that receives a set of pixels in an uncompressed first eye view video frame for an image, and pixel difference information between the set of pixels in the uncompressed first eye view video frame and a set of pixels in an uncompressed second eye view video frame for the image, wherein the pixel difference information is based on a difference between a shifted line of pixels for the uncompressed first eye view video frame from a corresponding line of pixels for the uncompressed second eye view video frame; and
a video processor that reconstructs the uncompressed set of pixels in the second eye view video frame for the image based on the pixel difference information and said first eye view set of pixels.

24. The communication station of claim 23, wherein:
the pixel difference information is based on spatial correlations between pixels in the first eye view set of pixels and corresponding pixels in the second eye view set of pixels, and pixel information for the image is reduced by using the pixel difference information in place of the uncompressed set of pixels in the second eye view video frame; and
the video processor reconstructs the uncompressed set of pixels in the second eye view video frame based on: said uncompressed set of pixels in the first eye view video frame, said pixel difference information, and displacement information between the first eye view video frame and the second eye view video frame.

25. The communication station of claim 24, wherein:
the video processor reconstructs the uncompressed set of pixels in the second eye view video frame at the receiving station based on the received first eye view set of pixels set, said pixel difference information and the displacement information.

26. The communication station of claim 24, wherein:
said pixel difference information comprises difference values between pixels in the first eye view set of pixels and corresponding pixels in the second eye view set of pixels.

27. The communication station of claim 24, wherein:
said pixel difference information comprises horizontal difference information, such that vertical difference information is not transmitted over the communication medium.

28. The communication station of claim 24, wherein:
said pixel difference information comprises an estimate of differences between pixels in the first eye view set of pixels and corresponding pixels in the second eye view set of pixels.

29. The communication station of claim 24, wherein the pixel difference information has sub-pixel resolution.

30. The communication station of claim 23, wherein:
the communication station comprises a receiving wireless station such that the communication module receives transmissions from a wireless transmitting station over a wireless communication medium.

31. The communication station of claim 23, wherein:
a first eye view comprises a left-eye view of the image and a second eye view comprises a right-eye view of the image.

32. The communication station of claim 23, wherein:
the reduced set of pixels comprises reduced pixel information based on using redundant information residing in one of the first eye view and second eye view frames of stereoscope 3D video format.

33. The method of claim 1, wherein transmitting of said encoded pixel difference information and the uncompressed set of pixels in the first eye view video frame reduces wireless communication rate requirements.

34. The method of claim 1, wherein:
a second eye view of the image comprises a shift in viewing position from a first eye view of the image.

35. The method of claim 1, further comprising:
receiving a pair of 3D video information streams for the image comprising the set of pixels in the uncompressed first eye view video frame and the set of pixels in the uncompressed second eye view video frame; and
generating the encoded pixel difference information between the uncompressed first eye view video frame and the uncompressed second eye view video frame.

36. The method of claim 35, further comprising:
receiving the transmitted set of pixels in the uncompressed first eye view video frame and the encoded pixel difference information at a receiving wireless station; and
reconstructing the pair of 3D video information streams using the set of pixels in the uncompressed first eye view video frame and the encoded pixel difference information.

* * * * *